(12) United States Patent
Qin et al.

(10) Patent No.: US 10,230,317 B2
(45) Date of Patent: Mar. 12, 2019

(54) MOTOR AND FAN HAVING MOTOR

(71) Applicant: JOHNSON ELECTRIC INTERNATIONAL AG, Murten (CH)

(72) Inventors: Rui Feng Qin, Hong Kong (CN); Xin Hui Guan, Shenzhen (CN); Kwok Kuen Tse, Hong Kong (CN); Tao Qu, Shenzhen (CN); Zhong Wan, Shenzhen (CN); Kai Qi Xu, Shenzhen (CN); Bao Yi Xu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/611,209

(22) Filed: Jun. 1, 2017

(65) Prior Publication Data
US 2017/0353132 A1 Dec. 7, 2017

(30) Foreign Application Priority Data

Jun. 1, 2016 (CN) .......................... 2016 1 0387841

(51) Int. Cl.
H02P 1/46 (2006.01)
H02P 7/29 (2016.01)
(Continued)

(52) U.S. Cl.
CPC .............. H02P 7/2913 (2013.01); H02J 3/34 (2013.01); H02K 11/33 (2016.01); H02P 7/2805 (2013.01);
(Continued)

(58) Field of Classification Search
CPC .... H02P 1/46; H02P 27/06; H02P 9/48; H02P 9/10; B60K 17/35; B60K 6/26; B60K 6/48
(Continued)

(56) References Cited

U.S. PATENT DOCUMENTS 6,622,805 B2 * 9/2003 Nakashima .............. B60K 6/48
180/65.25
7,031,813 B2 * 4/2006 Sugiyama .............. B62D 5/008
180/446
(Continued)

Primary Examiner — Rina Duda
(74) Attorney, Agent, or Firm — Muncy, Geissler, Olds & Lowe, P.C.

(57) ABSTRACT

A fan and a motor thereof are provided. The motor includes a motor drive device. The motor drive device includes a printed circuit board. A control management unit and a voltage converter are arranged on the printed circuit board, the control management unit classifies target rotation speed signals provided by an ECU into multiple rotation speed intervals, with each rotation speed interval corresponding to a fixed duty ratio. The control management unit receives a target rotation speed signal transmitted from the ECU in a real-time manner, and outputs a pulse width modulation signal having a duty ratio corresponding to the rotation speed interval to which the target rotation speed signal transmitted from the ECU belongs. The voltage converter is connected between the power source and the winding, and is configured to regulate a voltage outputted to the winding in response to the pulse width modulation signal having the fixed duty ratio outputted from the control management unit, to control a rotation speed of the motor. The motor drive device performs segment control on the rotation speed of the motor, thereby reducing the cost.

28 Claims, 14 Drawing Sheets

(51) Int. Cl.
*H02J 3/34* (2006.01)
*H02P 7/28* (2016.01)
*H02K 11/33* (2016.01)
*H02J 7/34* (2006.01)
*H02M 5/458* (2006.01)
*H02M 3/156* (2006.01)

(52) U.S. Cl.
CPC ................ *H02J 7/34* (2013.01); *H02M 3/156* (2013.01); *H02M 5/458* (2013.01); *H02P 7/29* (2013.01)

(58) Field of Classification Search
USPC ................ 318/727, 800, 801, 461, 599, 811
See application file for complete search history.

(56) References Cited

U.S. PATENT DOCUMENTS

| | | | | |
|---|---|---|---|---|
| 7,394,227 B2 * | 7/2008 | Uematsu | ................ | H02P 9/48 322/27 |
| 8,134,322 B2 * | 3/2012 | Nakai | ................ | F16H 61/32 318/437 |
| 8,487,564 B2 * | 7/2013 | Kitagawa | ................ | H02P 6/15 318/400.01 |
| 8,564,255 B2 * | 10/2013 | Nakayama | ........ | H02M 7/53871 322/29 |

* cited by examiner

MOTOR AND FAN HAVING MOTOR

FIELD

The present disclosure relates to a cooling apparatus, and particularly to a fan applied to a cooling system of a vehicle, and a motor for the fan.

CROSS REFERENCE TO RELATED APPLICATIONS

This non-provisional patent application claims priority under 35 U.S.C. § 119(a) from Patent Application No. 201610387841.1 filed in The People's Republic of China on Jun. 1, 2016.

BACKGROUND

A fan device is widely applied into a cooling apparatus, and is used for dissipating heat of heat generating components such as a vehicle engine. An engine cooling fan used in an existing engine cooling system controls a rotation speed of the fan by regulating resistance. In a motor drive device for controlling the rotation speed of the fan, a relay is used to regulate the resistance value of the resistance, and multiple wire harnesses are used to deliver a control signal between an electronic control unit (ECU) of the vehicle and the relay, which results in increase of cost of the fan.

In another existing way, the rotation speed of the fan is regulated by a pulse width modulation (PWM) regulator. The PWM regulator is connected to the ECU of the vehicle, to change a duty ratio in a real-time manner in response to an instruction of the ECU, so that a voltage outputted to a motor of the fan is regulated, and further the rotation speed of the fan is regulated continually. However, a field effect transistor (Mosfet) is switched at a high frequency for continually regulating the rotation speed of the fan, which results in high power consumption and the significant increase of the cost of the fan, since a large radiator needs to be installed to dissipate heat generated by the power consumption and an expensive microprocessor is required to process diagnosis feedback information on operation of the fan.

SUMMARY

In view of this, it is desired to provide a motor with a low cost and a fan having the motor.

A motor is provided according to an embodiment of the present disclosure, which includes a stator, a rotor capable of rotating with respect to the stator and a motor drive device. The rotor includes a rotary shaft, an iron core fixed on the rotary shaft and a winding arranged on the iron core. The motor drive device is connected between the winding and a power source, and the motor drive device includes a printed circuit board. A control management unit and a voltage converter are arranged on the printed circuit board, the control management unit is configured to classify target rotation speed signals provided by an ECU into a plurality of rotation speed ranges, each corresponding to a specific output duty ratio, the control management unit is configured to receive a target rotation speed signal transmitted from the ECU in a real-time manner, and output a voltage regulating signal, which is a pulse width modulation signal having a duty ratio corresponding to the rotation speed range to which the target rotation speed signal transmitted from the ECU falls; The voltage converter is connected between the power source and the winding, and is configured to regulate a voltage outputted to the winding in response to the voltage regulating signal having the specific duty ratio outputted from the control management unit, to regulate a rotation speed of the motor.

As a preferred embodiment, the control management unit is configured to classify the target rotation speed signals provided by the ECU into four rotation speed ranges, which are a stalling range, a low-speed range, a middle-speed range and a full-speed range.

As a preferred embodiment, the target rotation speed signal is in the stalling range in a case that a duty ratio of the target rotation speed signal is less than a ratio value X1, which is less than 10%, the target rotation speed signal is in the low-speed range in a case that the duty ratio of the target rotation speed signal is greater than or equal to the ratio valve X1 and less than a ratio value X2, which is greater than the ratio valve X1 and less than or equal to 50%, the target rotation speed signal is in the middle-speed range in a case that the duty ratio of the target rotation speed signal is greater than or equal to the ratio valve X2 and less than a ratio value X3, which is greater than the ratio valve X2 and less than or equal to 90%, and the target rotation speed signal is in the full-speed range in a case that the duty ratio of the target rotation speed signal is greater than or equal to the ratio value X3 and less than 100%.

As a preferred embodiment, X1 is less than or equal to 5%.

As a preferred embodiment, X2 is less than or equal to 40%.

As a preferred embodiment, X3 is less than or equal to 80%.

As a preferred embodiment, a duty ratio of the voltage regulating signal corresponding to the stalling range is equal to 0, a duty ratio of the voltage regulating signal corresponding to the low-speed range is equal to a ratio value Y1, which is greater than or equal to 20% and is less than or equal to 50%, a duty ratio of the voltage regulating signal corresponding to the middle-speed range is equal to a ratio value Y2, which is greater than or equal to 50% and less than or equal to 80%, and a duty ratio of the voltage regulating signal corresponding to the full-speed range is equal to 100%.

As a preferred embodiment, the control management unit is configured to classify the target rotation speed signals provided by the ECU into three rotation speed ranges, which are a stalling range, a low-speed range and a full-speed range, and a duty ratio of the voltage regulating signal corresponding to the low-speed range ranges from 20% to 80%.

As a preferred embodiment, the control management unit includes: a command manager configured to determine the rotation speed range to which the target rotation speed signal transmitted from the ECU falls, and output a target voltage in an analog form based on the duty ratio corresponding to the rotation speed range; and a PWM generator, in which a triangular wave oscillator for generating a triangular wave is arranged, wherein the target voltage is compared with the triangular wave to output the pulse width modulation signal.

As a preferred embodiment, the voltage converter comprises a diode and an MOS transistor connected between a positive electrode of the power source and ground in series, a cathode of the diode is connected to the positive electrode of the power source, an anode of the diode is connected to a drain of the MOS transistor, and a source of the MOS transistor is grounded, a gate of the MOS transistor receives the voltage regulating signal outputted from the control management unit, and the anode and the cathode of the diode are configured to be connected to the motor.

As a preferred embodiment, the stator includes a cylindrical case, multiple permanent magnets arranged at an inner wall of the cylindrical case and an endcap, an opening is formed at one end of the cylindrical case in an axial direction, and the endcap is fixed at the opening of the cylindrical case in the axial direction. The motor further includes a brush assembly arranged on the endcap, the brush assembly includes a brush holder and two brushes arranged on the brush holder. A commutator electrically with the winding is arranged on the rotor, the brush is in sliding contact with the commutator, and the printed circuit board of the motor drive device is arranged on the brush holder.

As a preferred embodiment, the brush holder is in an annular shape with a through hole at the center, and the commutator on the rotor passes through the through hole at the center of the brush holder. The two brushes are arranged on the brush holder at an interval in a circumferential direction, a mounting groove is arranged on the brush holder, and the printed circuit board of the motor drive device is accommodated in the mounting groove.

As a preferred embodiment, an arc-shaped hole for dissipating heat is arranged on a bottom wall of the mounting groove, and a heat dissipation hole in communication with the arc-shaped hole is arranged at a position of the endcap corresponding to the arc-shaped hole.

As a preferred embodiment, a filtering unit connected with the voltage converter is arranged on the printed circuit board, the filtering unit includes an inductor, a first capacitor and a second capacitor, the inductor is connected between the power source and the voltage converter, and one end of the inductor connected with the power source is grounded via the first capacitor, one end of the inductor connected to the voltage converter is grounded via the second capacitor, and the inductor, the first capacitor and the second capacitor are located at a position of the printed circuit board directly facing the arc-shaped hole.

As a preferred embodiment, the motor further includes a radiator, and the radiator is mounted outside the endcap of the motor and is attached to an outer surface of the endcap of the motor closely.

As a preferred embodiment, the radiator includes a substrate in an annular-sector shape and a side wall perpendicularly extending from an outer edge of the substrate. A projection portion is arranged at a position of the substrate corresponding to the heat dissipation hole and the arc-shaped hole, the projection portion extends into the heat dissipation hole and the arc-shaped hole to be close to the printed circuit board.

As a preferred embodiment, a connector for connecting the motor drive device with the power source and the ECU is integrated at one end of the brush holder, the connector includes a base and a shielding housing covered on the base. Three slots are formed on the base, one end of each of three input terminals is accommodated in one of the slots of the base, and is connected with a wire, and the wire extends out of one end of the base. The other end of each of the three input terminals extends from the other end of the base, and is fixed on the printed circuit board.

As a preferred embodiment, two output terminals are arranged on the printed circuit board, and the voltage converter is configured to output a voltage to the winding by the two output terminals.

As a preferred embodiment, the stator includes a cylindrical case, an opening is formed at one end of the cylindrical case in an axial direction, and an endcap is fixed at the opening of the cylindrical case in the axial direction, a brush holder is arranged in a first accommodating space of the endcap, and the printed circuit board of the motor drive device is arranged in a second accommodating space of the endcap.

As a preferred embodiment, the first accommodating space is located at an inner side of the endcap, and the second accommodating space is located at an outer side of the endcap.

As a preferred embodiment, the motor drive device includes a connector, the connector is arranged at a coupling position where the endcap is coupled to the case, and includes a holding portion held at the coupling position where the endcap is coupled to the case and a mounting portion extending from one end of the holding portion. Three input terminals for connecting the power source and the ECU and two output terminals for outputting a voltage provided to the winding are arranged on the mounting portion.

As a preferred embodiment, one end of each of the input terminals is connected with a wire, and the other end of each of the input terminals extends outside the mounting portion towards the endcap.

As a preferred embodiment, two terminal grooves are arranged on the mounting portion, each of the output terminals is in a U shape, and includes two vertical arms and a horizontal portion, the horizontal portion is arranged in the mounting portion, and one vertical arm of the output terminal extends outside the mounting portion towards the endcap, and two side walls of the other vertical arm of the output terminal bends oppositely to form a ring-shaped portion and are inserted into the terminal groove corresponding to the ring-shaped portion.

As a preferred embodiment, a brush and a metal sheet are arranged on the brush holder, the metal sheet is configured to connect the brush to the output terminal, and the metal sheet is inserted into the terminal groove, and is electrically connected to the other vertical arm of the output terminal.

As a preferred embodiment, a recess portion is recessed at an outer side of the endcap, to accommodate the printed circuit board of the motor drive device.

As a preferred embodiment, a through slot is arranged on a bottom wall of the recess portion, and the other end of the input terminal of the connector and one vertical arm of the output terminal pass through the through slot to insert onto the printed circuit board.

As a preferred embodiment, the motor further includes a sealing cover for fixing the printed circuit board onto the endcap.

A fan is provided according to the embodiments of the present disclosure, which includes any motor described above and an impeller driven by the motor.

In the fan and the motor according to the embodiments of the present disclosure, segment control is performed on the duty ratio of the pulse width modulation signal outputted to the winding based on the duty ratio of the target rotation speed signal outputted by the ECU, therefore, only one MOS transistor is required in the voltage converter to regulate the speed of the fan, and only one wire harness is required in the ECU to connect the ECU to the motor drive device, therefore, the motor according to the embodiments of the present disclosure has a simple structure, a high efficiency and a low cost.

BRIEF DESCRIPTION OF THE DRAWINGS

In the figures.

Figure 1:
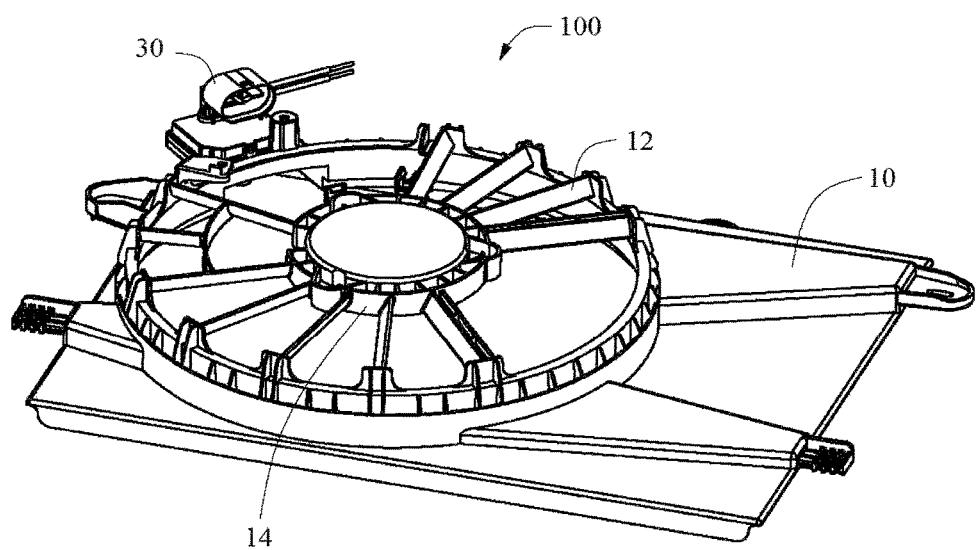
FIG. 1 is a schematic diagram showing a partial structure of a fan according to a first embodiment of the present disclosure, in which the fan includes a motor drive device.

The embodiments of the present disclosure are further illustrated in conjunction with the above drawings.

DETAILED DESCRIPTION OF EMBODIMENTS

The technical solution according to the embodiments of the present disclosure are described clearly and completely below in conjunction with the drawings in the embodiments of the present disclosure, obviously, the described embodiments are only a part rather than all of the embodiments. Based on the embodiments of the present disclosure, all other embodiments acquired by those skilled in the art without any creative work fall within the scope of protection of the present disclosure. It should be understood that the drawings are only used for reference and illustration, and are not intended to limit the present disclosure. The size shown in the drawings is only used for clarity of description, rather than limiting a proportional relationship.

It should be noted that, in a case that one component is "connected" to another component, the component may be connected to the other component directly or via a middle component. Unless otherwise defined, all technological and scientific terms used herein have the same meaning as that generally understood by those skilled in the art of the present disclosure. Terms used in the specification of the present disclosure herein are only used to describe specific embodiments, and are not intended to limit the present disclosure.

Referring to FIG. 1, a fan 100 according to an embodiment of the present disclosure is configured to dissipate heat or perform ventilation for an apparatus. A vehicle engine is taken as an example of the apparatus in the embodiment, the fan 100 includes a fan housing 10, a motor 20 (referring to FIG. 3) mounted on the fan housing 10, an impeller 80 driven by the motor 20, and a motor drive device 30 mounted on the fan housing 10.

Specifically, on the fan housing 10, a vent hole with a large area is arranged, and multiple spokes 12 extending toward a center of the vent hole are arranged. A hub portion 14 is fixed at one end of each of the spokes 12, and the hub portion 14 is arranged at the center of the vent hole. The motor 20 is mounted on the hub portion 14, and the motor 20 is an inner rotor motor, the impeller 80 is fixed on a rotor of the motor. The motor 20 and the impeller 80 are accommodated in the vent hole.

Figure 2:
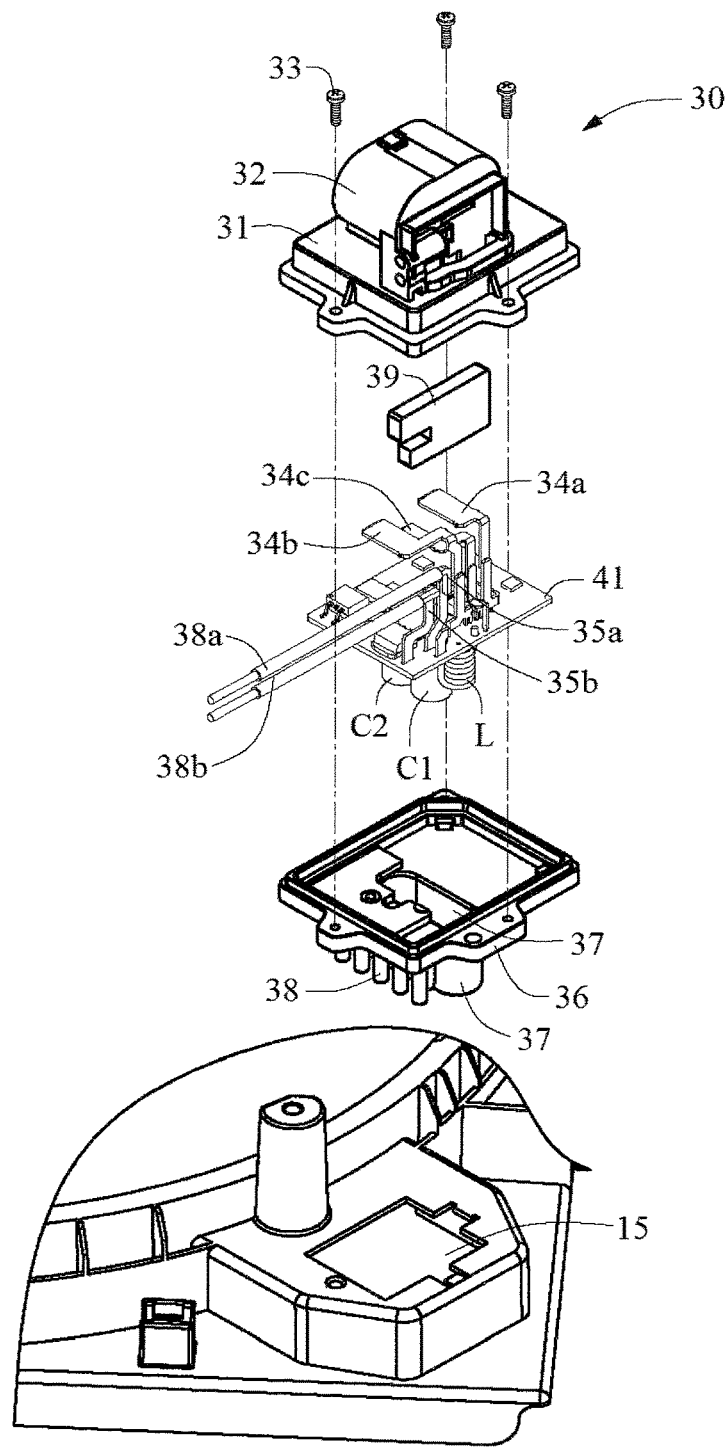
FIG. 2 is an exploded view of the motor drive device shown in FIG. 1.
Figure 3:
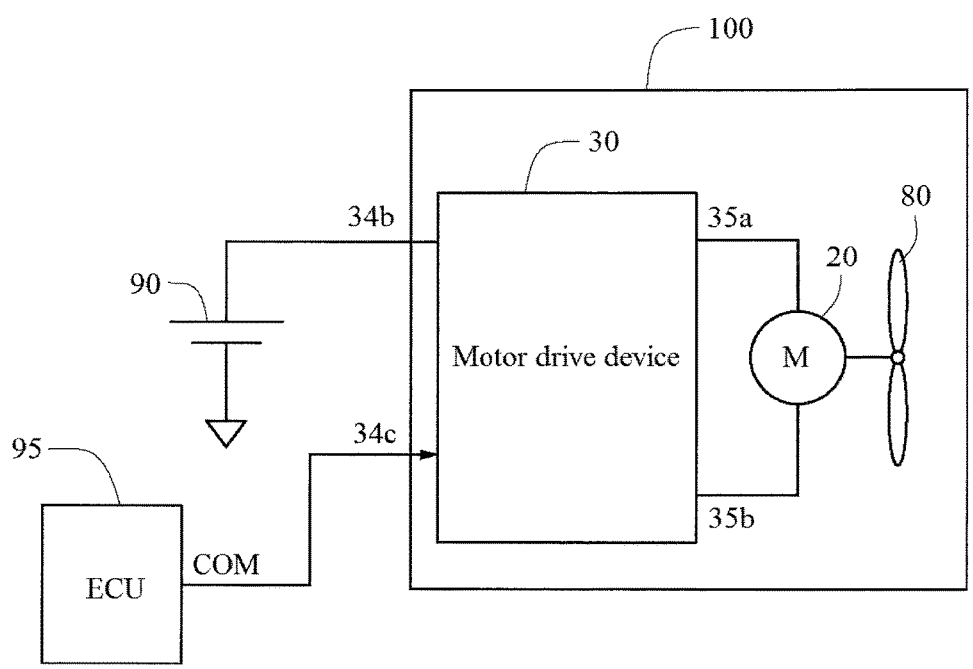
FIG. 3 is a functional block diagram of the motor drive device.

Referring to FIG. 2 and FIG. 3, a recess area 15 is arranged at an outer edge of the fan housing 10, to mount the motor drive device 30. In a circuit connection relation, the motor drive device 30 is connected between an external power source 90 and the motor 20 in series, and is configured to receive a target rotation speed signal COM of an electronic control unit (ECU) 95 of the vehicle, and change a voltage outputted to the motor 20 in response to the target rotation speed signal COM of the ECU 95, to change a rotation speed of the motor 20, so that a rotation speed of the fan 100 is changed based on a change in a heat dissipation requirement of the motor of the vehicle. Preferably, the power source 90 is a battery of the vehicle.

The motor drive device 30 includes a case 31 and a radiator 36 buckle-mounted together, and a printed circuit board 41 mounted in the case 31. Preferably, each of the case 31 and the radiator 36 is in a shape of hemi-case, the case 31 and the radiator 36 are buckle-mounted together by multiple screws 33, to form a complete enclosure.

A connector 32 is formed integrally with the case 31, and includes three input terminals and two output terminals mounted inside, which are an input terminal 34a, an input terminal 34b, an input terminal 34c, an output terminal 35a and an output terminal 35b. Preferably, positions and functions of the three input terminals 34a to 34c are the same as those of a traditional connector. For example, the input terminal 34a is connected to a negative electrode of the external power source 90, the input terminal 34b is connected to a positive electrode of the external power source 90, and the input terminal 34c is connected to the ECU95 to receive the target rotation speed signal COM outputted from the ECU95. One end of each of the input terminals 34a to 34c is folded outward, to connect to a coordinating connector. The other end of each of the input terminals 34a to 34c is inserted onto the printed circuit board 41, to transmit the voltage provided by the power source 90 and the target rotation speed signal COM to the printed circuit board 41. One end of each of the output terminals 35a and 35b is inserted onto the printed circuit board 41, and the other end of each of the output terminals 35a and 35b is connected to the motor 20 by wires 38a and 38b. The output terminals 35a and 35b are connected to the positive electrode and the negative electrode of the motor, respectively. A sealant 39 is arranged at the rear portion of the connector 32, to seal the connector 32. The enclosure of the motor drive device 30 has a function of water-proofing and moisture-proofing. In the embodiment, the wires 38a and 38b extend from the connector 32.

The ECU95 collects information on an operation state of each part of the engine by various sensors (including a temperature sensor, a pressure sensor, a rotation sensor, a flow sensor, a position sensor and the like). The ECU95 receives and analyzes the information, to acquire an operation environment of the vehicle and an operation state of the engine, and the ECU95 further determines which executive element is used to execute which operation in the known operation state according to an program operation, and then transmits an instruction to the executive element, to command the executive element to operate. In the embodiment, the ECU95 transmits the target rotation speed signal COM to the motor drive device 30 of the fan 100 for dissipating heat for the engine of the vehicle based on an operation environment of the vehicle and an operating state of the motor, and the motor drive device 30 recognizes the target rotation speed signal COM and controls a rotation speed of the fan in response to the target rotation speed signal COM.

Figure 4:
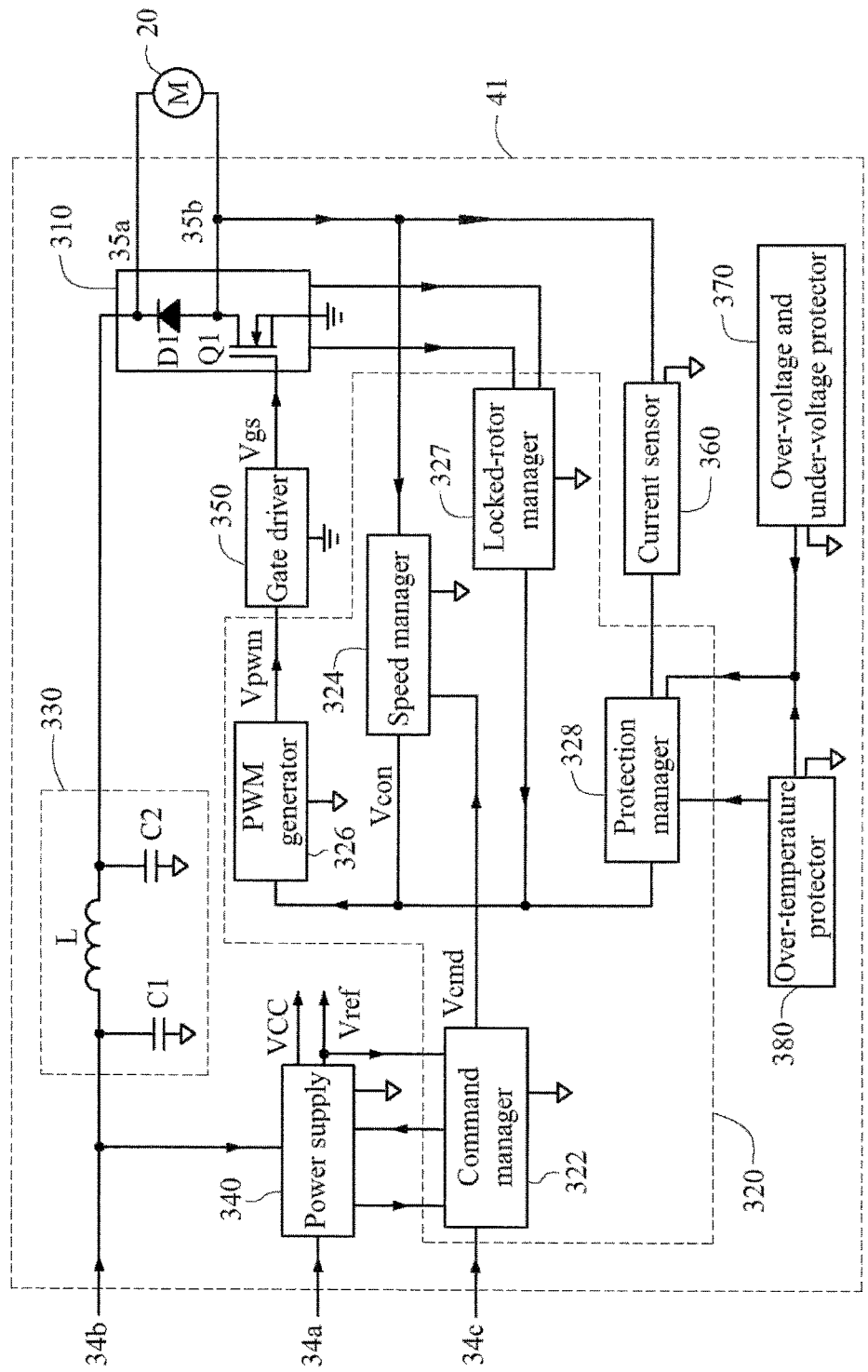
FIG. 4 is a circuit schematic diagram of the motor drive device shown in FIG. 3.

Referring to FIG. 4, the motor drive device 30 classifies the target rotation speed signals COM provided by the ECU95 into multiple rotation speed ranges. Each rotation speed range corresponds to a specific duty ratio. The motor drive device 30 outputs a voltage regulating, which is a pulse width modulation (PWM) signal having a duty ratio corresponding to an range to which the target rotation speed signal COM transmitted from the ECU95 falls in response to the received target rotation speed signal COM, to regulate a rotation speed of the motor 20 and drive the impeller 80 to operate at the rotation speed. In the embodiment, the target rotation speed signal COM outputted from the ECU95 is a PWM (Pulse Width Modulation) instruction signal having a low frequency ranging from 10 HZ to 1 KHZ.

A control management unit 320, a voltage converter 310, a filtering unit 330, a power supply 340, a gate driver 350, a current sensor 360, an over-voltage and under-voltage protector 370 and an over-temperature protector 380 are arranged on the printed circuit board 41 of the motor drive device 30.

The filtering unit 330 is connected between the input terminal 34b and the voltage converter 310, and is configured to filter out noise in a voltage of the voltage converter 310. The filtering unit 330 includes an inductor L, and capacitors C1 and C2. The inductor L is connected between the input terminal 34b and the voltage converter 310, the capacitor C1 is connected between the input terminal 34b and the ground, and the capacitor C2 is connected between the ground and a node between the inductor L and the voltage converter 310. In arrangement on the printed circuit board 41, an element easy to generate heat, such as the inductor L and the capacitors C1 and C2, is located on one side of the printed circuit board 41 towards the radiator 36 (referring to FIG. 2). The radiator 36 has a concave cavity 37 for accommodating the element easy to generate heat, such as the inductor L and the capacitors C1 and C2, to better receive and dissipate heat of the element easy to generate heat. Heat dissipating posts 38 extruding from a surface of a main body of the radiator are formed on the radiator 36, to increase a heat dissipating area of the radiator 36. Preferably, a wall portion 39 of the concave cavity 37 also extrudes from the surface of the main body of the radiator 36.

The power supply 340 is connected to a power source 90 via a terminal 34b and a terminal 34a, to convert a voltage provided by the power source 90 into a power supply voltage VCC and a reference voltage Vref required by each element in the motor drive device 30. The reference voltage Vref is a stabilized voltage, and is provided to a circuit such as the over-voltage and under-voltage protector 370 as a reference voltage.

The control management unit 320 is configured to receive the target rotation speed signal COM transmitted from the ECU95, and classify the target rotation speed signals COM provided by the ECU95 into multiple rotation speed ranges. Each rotation speed range corresponds to a specific duty ratio. The control management unit 320 receives the target rotation speed signal COM transmitted from the ECU95 in a real-time manner, and outputs a voltage regulating signal Vpwm, which is a PWM (Pulse Width Modulation) signal having a duty ratio corresponding to the received target rotation speed signal COM to the voltage converter 310 in response to the received target rotation speed signal COM. The voltage converter 310 modulates a voltage provided by the power source 90 in response to the voltage regulating signal Vpwm, and input the modulated voltage to the motor 20 to control operation of the motor 20.

The control management unit 320 includes a command manager 322, a speed manager 324, a PWM generator 326 and a locked-rotor manager 327 and a protection manager 328.

The command manager 322 is configured to receive the target rotation speed signal COM for regulating the rotation speed of the fan outputted from the ECU95, and output a target voltage Vcmd in an analog form based on the duty ratio corresponding to the rotation speed range to which the target rotation signal COM falls.

In the embodiment, the target rotation speed signals COM provided by the ECU95 are classified into four rotation speed ranges, each rotation speed range corresponding to a specific duty ratio of the rotation speed of the motor 20.

Figure 5:
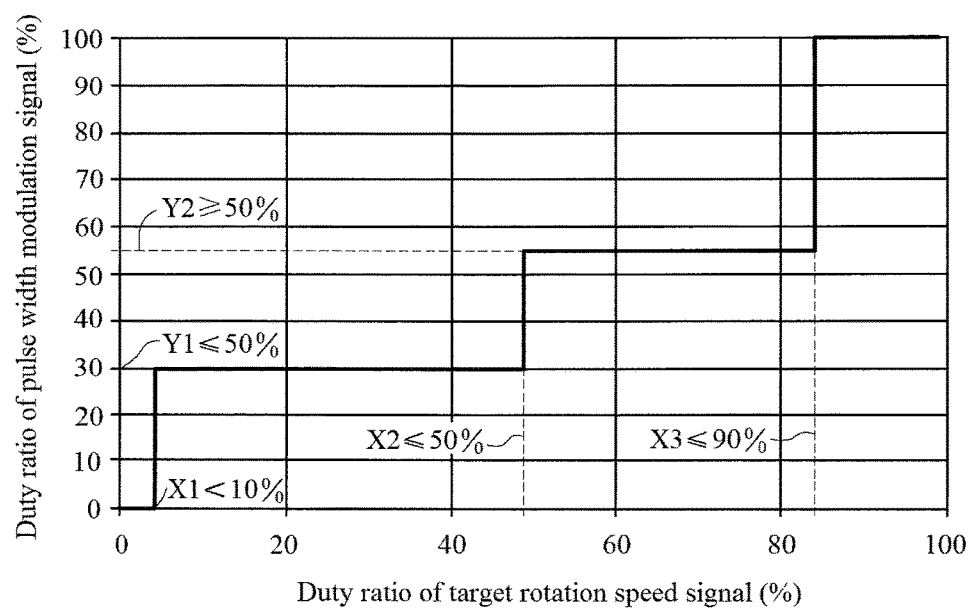
FIG. 5 is a relationship diagram of outputting a voltage regulating signal having a specific duty ratio in segment based on a duty ratio of a target rotation speed signal outputted from an ECU.

Referring to FIG. 5, the target rotation speed signal COM is in a stalling range in a case that a duty ratio of the target rotation speed signal COM is less than X1, the target rotation speed signal COM is in a low-speed range in a case that the duty ratio of the target rotation speed signal COM is greater than or equal to X1 and less than X2, the target rotation speed signal COM is in a middle-speed range in a case that the duty ratio of the target rotation speed signal COM is greater than or equal to X2 and less than X3, and the target rotation speed signal COM is in a full-speed range in a case that the duty ratio of the target rotation speed signal COM is greater than or equal to X3 and less than 100%, where $0<X1<X2<X3<100\%$. A duty ratio of a voltage regulating signal Vpwm corresponding to the stalling range is equal to 0, a duty ratio of a voltage regulating signal Vpwm corresponding to the low-speed range is equal to Y1, a duty ratio of a voltage regulating signal Vpwm corresponding to the middle-speed range is equal to Y2, and a duty ratio of a voltage regulating signal Vpwm corresponding to the full-speed range is equal to 100%, where $1<Y1<Y2<Y3<100\%$. Values of endpoints X1, X2 and X3 of the ranges can be adjusted according to different applications and designs of the motor. For example, X1 is less than 10%, and preferably less than or equal to 5%; X2 is less than or equal to 50%, and preferably less than or equal to 40%; X3 is less than or equal to 90%, and preferably less than or equal to 80%. The duty ratios Y1 and Y2 of the voltage regulating signal Vpwm can also be adjusted based on different applications and designs of the motor. For example, Y1 is greater than or equal to 20% and less than or equal to 50%, and Y2 is greater than or equal to 50% and less than or equal to 80%.

A principle of performing segment control on the rotation speed of the motor in response to the target rotation speed signal COM according to the embodiment of the present disclosure is illustrated with specific values as an example, the values are not intended to limit the present disclosure.

The target rotation speed signal COM provided by the ECU 95 is in a stalling range in a case that the duty ratio of the target rotation speed signal COM is less than 5%, and the specific duty ratio of the voltage regulating signal Vpwm corresponding to the stalling range is equal to 0. The target rotation speed signal COM is in a low-speed range in a case that the duty ratio of the target rotation speed signal COM is greater than or equal to 5% and less than 40%, and the duty ratio of the voltage regulating signal Vpwm corresponding to the low-speed range is equal to 30%. The target rotation speed signal COM is in a middle-speed range in a case that the duty ratio of the target rotation speed signal COM is greater than or equal to 40% and less than 80%, and the duty ratio of the voltage regulating signal Vpwm corresponding to the middle-speed range is equal to 55%. The target rotation speed signal COM is in a full-speed range in a case that the duty ratio of the target rotation speed signal COM is greater than or equal to 80% and less than 100%, and the duty ratio of the voltage regulating signal Vpwm corresponding to the full-speed range is equal to 100%. The target voltage Vcom has different voltage values corresponding to the different specific duty ratios. In practice, in the other embodiment, the number of rotation speed ranges is not limited to 4, a range of the target rotation speed signal corresponding to each range and a value of the specific duty ratio corresponding to the range can be adjusted according to design requirements. For example, the target rotation speed signals can be classified into three rotation speed ranges, which are a stalling range, a low-speed range and a full-speed range, and the duty ratio of the voltage regulating signal corresponding to the low-speed range may range from 20% to 80%. In the embodiment, the motor stalls if the duty ratio of the target rotation speed signal COM is equal to 100%. In other embodiment, the motor may operate at a full speed if the duty ratio of the target rotation speed signal COM is equal to 100%.

The speed manager 324 is connected to the command manager 322, the PWM generator 326 and the motor 20, and is configured to compare the target voltage Vcmd as the reference voltage with a voltage fed back by the motor 20, and output a control signal Vcon to the PWM generator 326 based on a comparison result. The speed manager 324 provides a feedback mechanism for regulating the rotation speed of the motor, and acquires an operation state of the motor by comparing the target voltage Vcmd with the voltage fed back by the motor. If a collected voltage fed back by the motor is less than the target voltage Vcmd, a voltage of the outputted control signal Vcon can be increased suitably, and therefore a duty ratio of the voltage regulating signal Vpwm generated by the PWM generator can be increased, so that a voltage outputted to the motor 20 is increased. Otherwise, a duty ratio of the voltage regulating signal Vpwm generated by the PWM generator 326 can be reduced, so that a voltage outputted to the motor 20 is reduced. A resulting effect is to enable the voltage outputted to the motor to infinitely approximate to the target voltage Vcmd. It can be understood by those skilled in the art that, the speed manager 324 may be omitted if the rotation speed of the motor is not required to be quite accurate, the target voltage Vcom may be directly provided to the PWM generator 326.

A triangular wave oscillator for generating a triangular wave is arranged in the PWM generator 326, and the control signal Vcon is compared with the triangular wave to output the voltage regulating signal Vpwm.

The voltage converter 310 includes an MOS transistor Q1, a diode D1 and a sampling resistor (not shown in FIG. 4). A gate of the MOS transistor Q1 is connected to the gate driver 350, a drain of the MOS transistor Q1 is connected to an anode of the diode D1, and a cathode of the diode D1 is connected to a positive electrode of the power source 90 via the filtering unit 330, and a source of the MOS transistor Q1 is grounded via the sampling resistor. The cathode of the diode is connected to the output terminal 35a, and the anode of the diode is connected to the output terminal 35b. The gate driver 350 is configured to perform power amplification on the voltage regulating signal Vpwm, to generate a gate source signal Vgs for driving the MOS transistor Q1, and therefore control the MOS transistor Q1 in the voltage converter 310 to be turned on or turned off. The voltage inputted by the power source 90 is modulated in response to the voltage regulating signal having a specific duty ratio, to control the MOS transistor Q1 to be turned on or turned off, and regulate the voltage inputted to the motor 20 and thus regulate the rotation speed of the fan.

For example, the ECU95 determines the duty ratio of the outputted target rotation speed signal COM based on the operation environment of the vehicle and the operation state of the engine. For example, when a temperature of the engine is low, the duty ratio of the target rotation speed controlling the rotation speed d signal COM outputted by the ECU95 is equal to 25%, and in this case, the fan 100 is required to dissipate heat for the engine at a low speed. The command manager 322 determines that the target rotation signal COM having the duty ratio of 25% is in the low-speed range, and outputs a target voltage Vcmd in an analog form having a duty ratio of 30% corresponding to the low-speed range to the speed manager 324. The speed manager 324 compares the target voltage Vcmd with a current voltage outputted to the motor, to enable the voltage outputted to the motor to approximate to the target voltage Vcmd as much as possible, and outputs a control signal Vcon to the PWM generator 326. The PWM generator 326 generates a voltage regulating signal Vpwm having a duty ratio corresponding to the low-speed range to the voltage converter 310. The voltage converter 310 controls the MOS transistor Q1 to be turned on and turned off at the duty ratio of 30%, to regulate the voltage outputted to the motor 20 and control the motor to drive the impeller to dissipate heat for the engine at a rotation speed having a duty ratio of 30%.

When the motor operates for a long time period, and has a high temperature and a high power, the duty ratio of the target rotation speed signal COM outputted from the ECU95 will be increased to for example 95%, and in this case, the fan is required to operate at a high speed to dissipate heat for the engine. The command manager 322 determines that the target rotation signal COM having the duty ratio of 95% is in a full-speed range. A voltage regulating signal Vpwm having a specific duty ratio of 100% corresponding to the full-speed range is outputted to the voltage converter 310. The voltage converter 310 controls the MOS transistor Q1 to be always turned on at the duty ratio of 100%, to control the motor 20 to drive the impeller 80 to operate at a full speed for dissipating heat for the engine. It should be understood by those skilled in the art that a case that the fan is required to operate at a middle speed according to the operation environment of the vehicle and the operation state of the engine has the same principle as described above, which is not repeated herein. In a case that the duty ratio of the target rotation speed COM outputted from the ECU95 is less than 5%, the target voltage outputted from the command manager 320 is equal to 0, and the motor 20 does not operate.

The fan 100 according to the embodiment of the present disclosure controls a duty ratio of the voltage regulating signal Vpwm outputted to the motor of the fan in segment (the stalling range, the low-speed range, the middle-speed range, the full-speed range) based on the duty ratio of the target rotation speed signal COM outputted from the ECUC95. Therefore, only one MOS transistor Q1 needs to be arranged in the voltage converter 310 to regulate the speed of the fan, and only one wire harness is used to connect the ECU 95 to the motor drive device 30. The motor drive device 30 according to the embodiment of the present disclosure has a simple structure, a high efficiency and a low cost.

Figure 6:
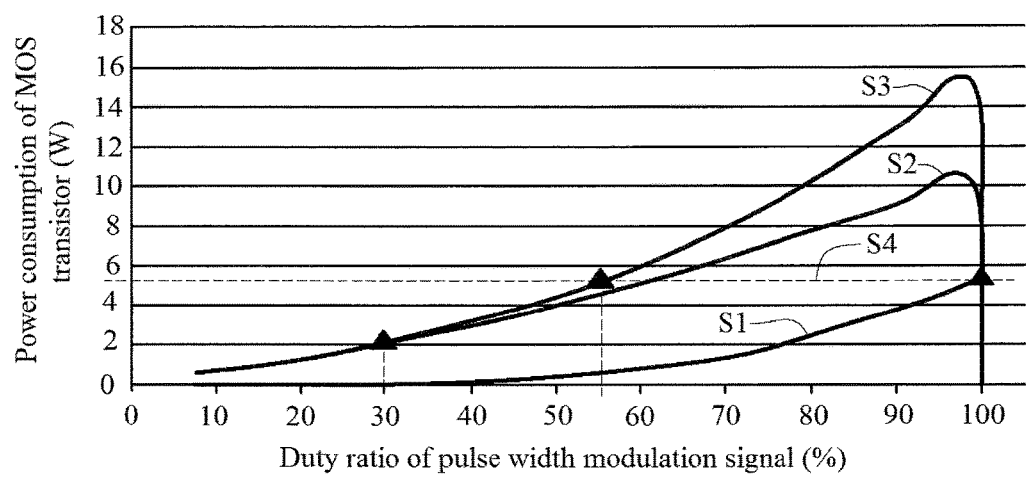
FIG. 6 is a comparison diagram between power consumption of an MOS transistor in a case of regulating a rotation speed of a motor of a fan in a traditional PWM manner and power consumption of an MOS transistor in a case of regulating a rotation speed of a motor of a fan according to the embodiment of the present disclosure.

Referring to FIG. 6, which is a comparison diagram between power consumption of an MOS transistor in a case of regulating a rotation speed of a motor of a fan in a traditional PWM manner and power consumption of an MOS transistor in a case of regulating a rotation speed of a motor of a fan according to the embodiment of the present disclosure, a curve S1 represents a conduction loss curve of the MOS transistor in a case of regulating the rotation speed of the motor of the fan in a traditional PWM manner, a curve S2 represents a switching loss curve of the MOS transistor in a case of regulating the rotation speed of the motor of the fan in the traditional PWM manner, a curve S3 represents a total power consumption curve of the MOS transistor in a case of regulating the rotation speed of the motor of the fan in a traditional PWM manner, and a dotted curve S4 represents a maximum power consumption curve of the MOS transistor in a case of regulating the rotation speed of the motor of the fan according to the embodiment of the present disclosure. It can be seen from FIG. 6 that, maximum power consumption is up to 15 W in a case of controlling the motor of the fan in the traditional PWM manner, and power consumption of the MOS transistor is less than 6 W in the embodiment of the present disclosure. Thus, the power consumption is reduced greatly in the embodiment. The power consumption of 15 W is only an example, and the maximum power consumption is increased with the increase of an internal resistance of the selected MOS transistor in consideration of constraining the cost of the MOS transistor in practice.

In the embodiment of the present disclosure, segment control is performed on the rotation speed of the fan without frequently switching a conduction state of the MOS transistor, thereby reducing power consumption, and significantly reducing heat generated by the power consumption, and significantly reducing the size of the radiator for dissipating heat for the motor drive device 30, and substantially achieving the same effect as real-time regulation of the traditional PWM manner.

With the embodiment of the present disclosure, the engine can also be protected from over-heat, over-voltage, over-current, under-voltage, locked-rotor and other cases or faults.

Referring to FIG. 4, the locked-rotor manager 327 acquires an operation state of the motor by collecting a voltage between two ends of the sampling resistor, and constrains a current threshold level of the motor 20 in an over-current state, so that the motor is still driven in a case that the current exceeds a threshold (for example, the case of locked-rotor in the motor).

The current sensor 360 is connected between the motor 20 and the protection manager 328, and is configured to detect a current flowing through the motor, and output a value of the current to the protection manager 328. When detecting that the current flowing through the motor exceeds a preset current value required by normal operation of the motor, the protection manager 328 output a protection signal to disable the control signal Vcon, and thus the PWM generator 326 stops operating, achieving over-current protection.

The over-voltage and under-voltage protector 370 is connected to the protection manager 328, for management in an over-voltage and under-voltage condition. When the voltage provided to the motor 20 is greater than or less than a preset voltage range required by the normal operation of the motor, over-voltage and under-voltage protector 370 outputs a protection signal to the protection manager 328. The protection manager 328 outputs a protection signal to disable the control signal Vcon, and thus the PWM generator 326 stops operating, achieving over-voltage and under-voltage protection.

The over-temperature protector 380 includes a temperature sensor. The temperature sensor senses a temperature of the voltage converter 310, and outputs an over-temperature protection signal to the protection manager 328 when detecting that the sensed temperature exceeds a preset temperature value. The protection manager 328 outputs a protection signal to disable the control signal Vcon, and thus the PWM generator 326 stops operating, achieving over-temperature protection.

It can be understood by those skilled in the art that a device for over-heat protection, over-voltage protection, over-current protection, under-voltage protection and locked-rotor protection and other protection may be arranged optionally in the motor drive device 30. In a case that the signal Vpwm generated by the PWM generator 326 can drives the MOS transistor Q1, the gate driver 350 may be omitted in the motor drive device 30.

Figure 7:
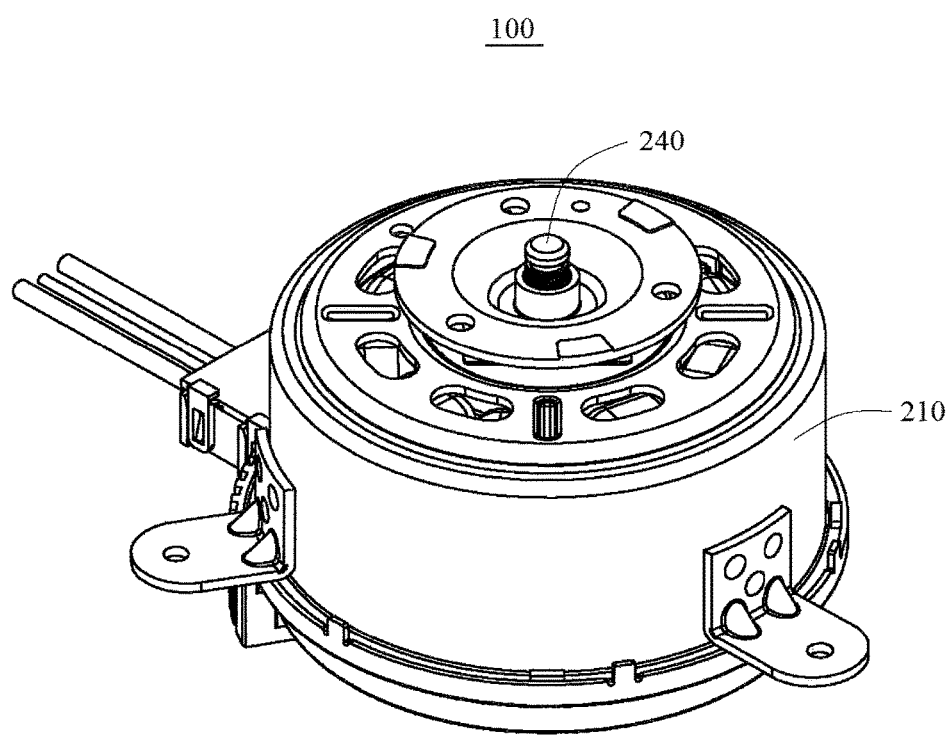
FIG. 7 is a schematic diagram showing a motor of a fan according to a second embodiment of the present disclosure.
Figure 8:
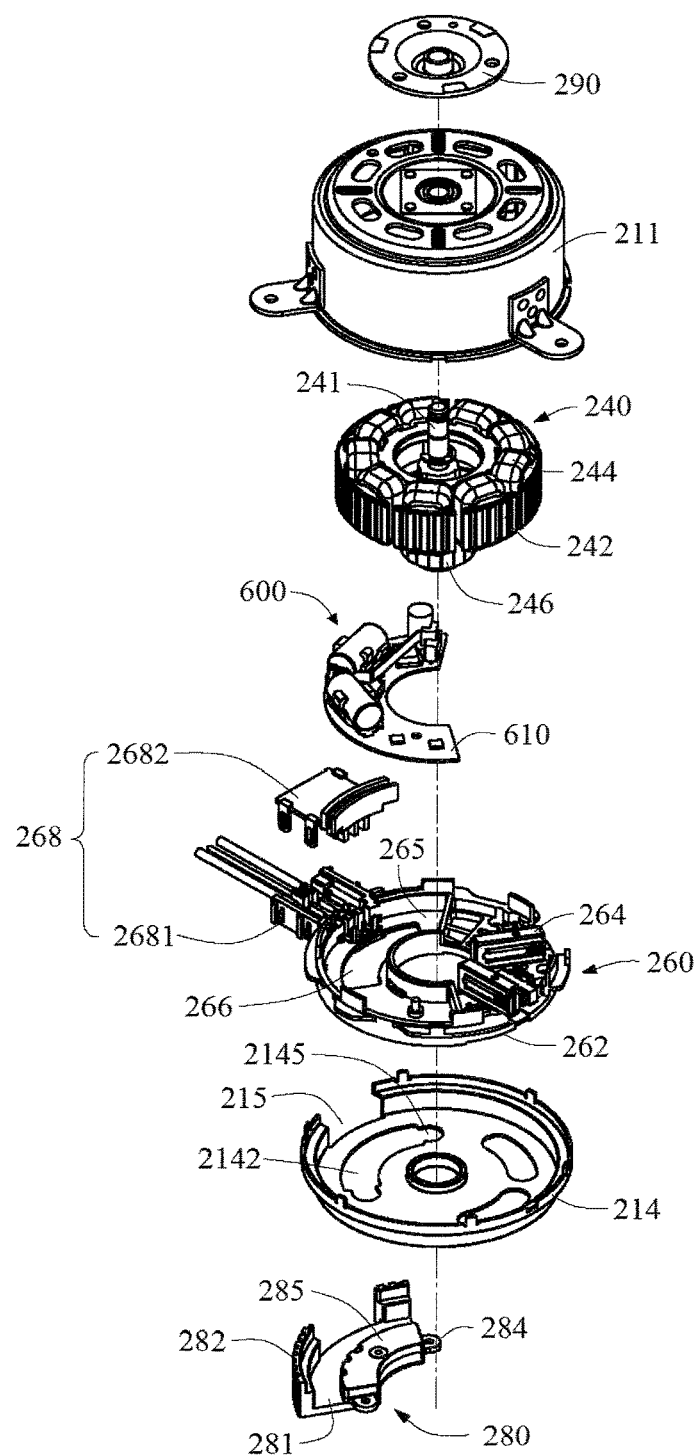
FIG. 8 is an exploded view of the motor shown in FIG. 7.
Figure 9:
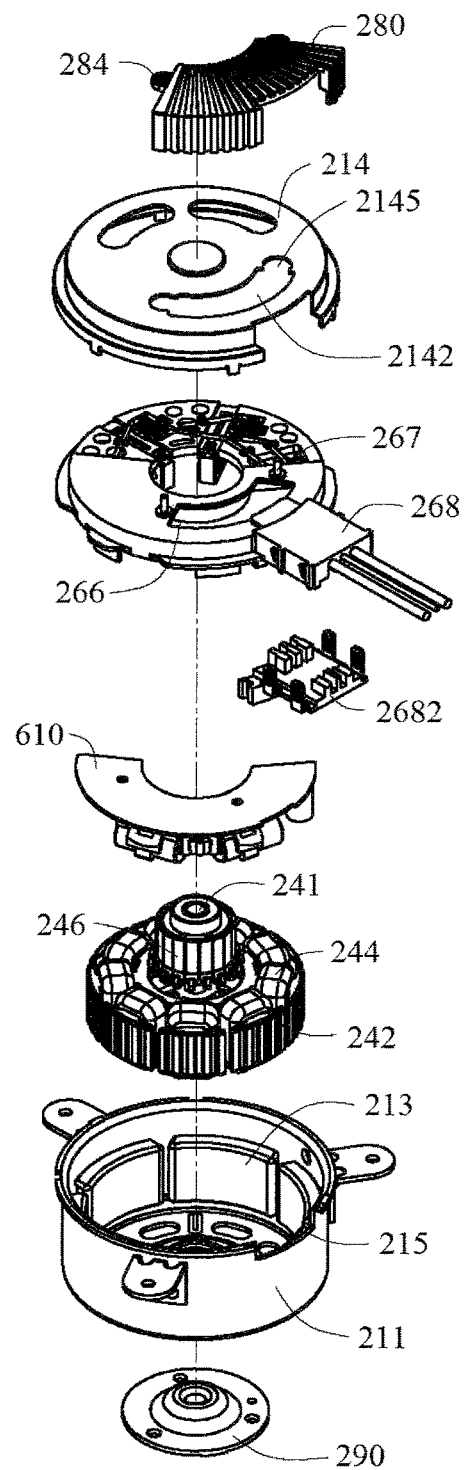
FIG. 9 is an exploded view of the motor shown in FIG. 8 in another direction.

Reference is made to FIG. 7 to FIG. 9. FIG. 7 is a perspective diagram of a motor 200 of a fan according to a second embodiment of the present disclosure. A main difference of the second embodiment from the first embodiment is that a motor drive device is arranged inside an enclosure of the motor.

The motor 200 according to the second embodiment of the present disclosure includes a stator 210, a rotor 240 capable of rotating with respect to the stator 210 and accommodated in the stator 210, a brush assembly 260, a motor drive device 600 and a radiator 280. The motor drive device 600 in the embodiment has a same circuit structure as the motor drive device 30 in the first embodiment, however, the motor drive device 600 in the embodiment is integrated on a printed circuit board 610, and the printed circuit board 610 is arranged in the motor 200.

The stator 210 includes a case 211 in an approximately-cylindrical shape, multiple permanent magnets 213 arranged on an inner wall of the case 211, and an endcap 214. An opening is formed at one end of the case in an axial direction, and the endcap 214 is fixed at the opening of the case 211 in the axial direction. The rotor 240 includes a rotary shaft, an iron core 242 fixed on the rotary shaft 241, a winding 244 wound around the iron core 242 and a commutator 246. The winding 244 is electrically connected to the commutator 246.

The endcap 214 is fixed at the opening of the case 211 in the axial direction, the rotary shaft 241 of the rotor 240 is supported by a bearing (not shown in FIG. 8) arranged at an axial closed end of the endcap 214 and the case 211, so that the rotor 240 is capable of rotating with respect to the stator 210.

The brush assembly 260 is also arranged at the opening of the case 211 in the axial direction, and is arranged between the endcap 214 and the rotor 240. The brush assembly 260 includes a brush holder 262 and two brushes 264 matched with the commutator 246. The brush holder 262 is in an annular shape with a through hole at the center, and the commutator can pass through the through hole at the center of the brush holder 262. The two brushes 264 are arranged on the brush holder at an range of 60 degrees in a circumferential direction. The brushes 264 extend in a radial direction of the motor 200. After the motor 200 is assembled, one end of each of the brushes 264 is in sliding contact with the commutator 246 of the rotor 240, and a voltage provided by the power source 90 is provided to the winding 244 via the brushes 264 and the commutator 246 under control of the motor drive device 600. A printed circuit board 610 of the motor drive device 600 is arranged on the brush holder 262, a mounting groove 265 is arranged at a part of the brush holder 262 where no brush 264 is arranged. Preferably, the mounting groove 265 is in an arc shape, and the printed circuit board 610 of the motor drive device 600 is also in an arc shape and accommodated in the mounting groove 265.

Figure 10:
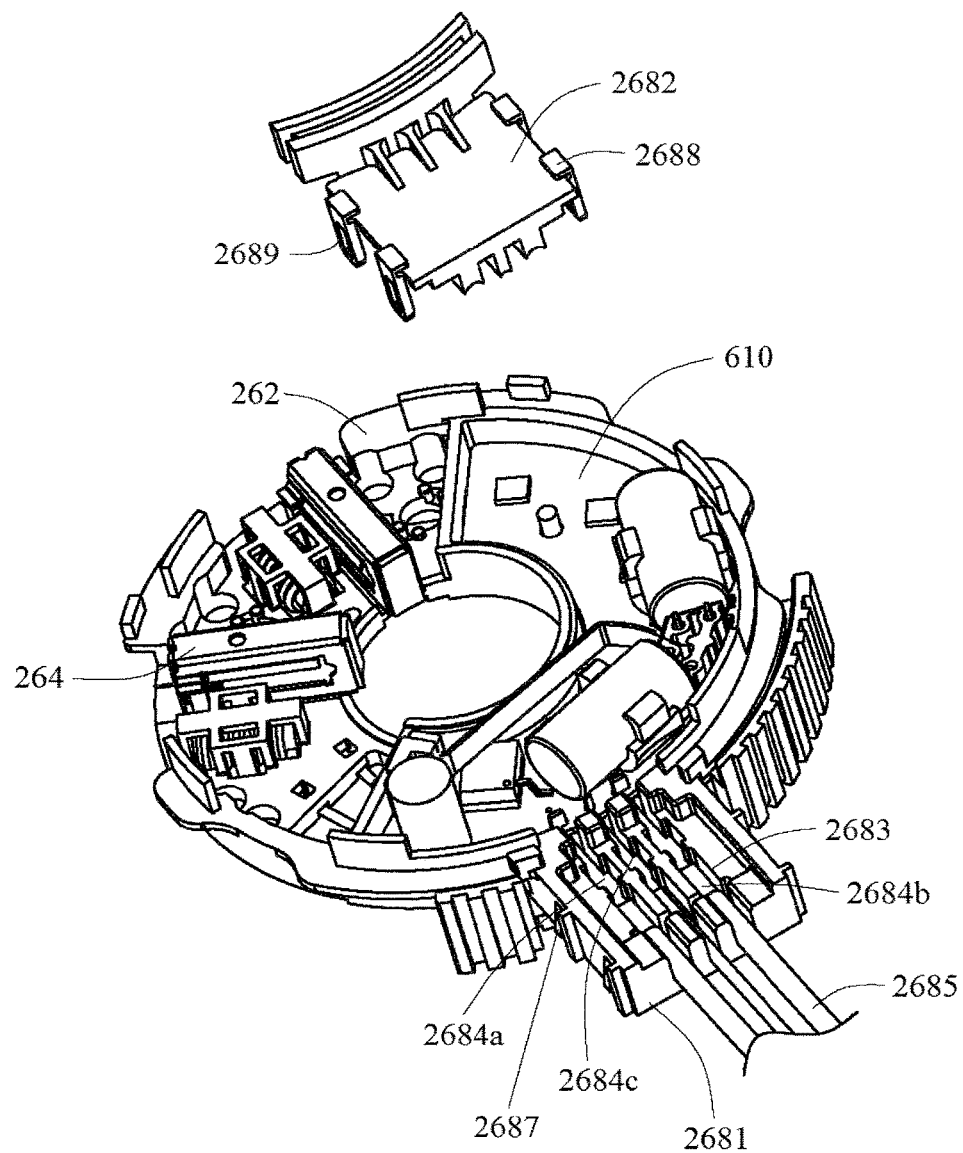
FIG. 10 is an assembly diagram showing that a printed circuit board of a motor drive device is mounted on a brush holder and is connected to a connector.

Referring to FIG. 10, a connector 268 for connecting the motor drive device 600 with the power source 90 and the ECU95 is arranged at one end of the brush holder 262, the connector 268 includes a base 2681, and a shielding housing 2682 arranged on the base 2681. Preferably, the base 2681 of the connector 268 is formed integrally with the brush holder 262. Three slots 2683 are formed on the base 2681, one end of each of the three input terminals 2684a to 2684c is accommodated in one of the slots 2683 of the base 2681, and is connected with a wire 2685. The wire 2685 extends out of one end of the base 2681, to connect to the power source 90 and the ECU95. The three input terminals 2684a to 2684c are connected to a negative electrode of the power source, a positive electrode of the power source and the ECU95, respectively. The other end of each of the three input terminals 2684a to 2684c extends from the other end of the base 2681, and bends perpendicularly to be inserted onto the printed circuit board 610, so that a voltage of the power source and the target rotation speed signal COM outputted by the ECU are transmitted to the power supply and the control management unit arranged on the printed circuit board 610. The shielding housing 2682 is covered on the insulation base 2681, and covers connection positions where the input terminals 2684a to 2684c are connected to the wires 2685. Convex snaps 2687 are arranged at two outer sides of the base 2681, and the shielding housing 2682 is provided with two mounting arms 2688 extending downward. The mounting arms 2688 is provided with button holes 2689. The convex snaps 2687 are snapped in the button holes 2689, to mount the shielding housing 2682 on the base 2681. Two output terminals (not shown) connected to an anode and a cathode of the diode are arranged on the printed circuit board 610. Two inductors are arranged on the brush holder 262, and the two output terminals are connected to the two brushes 264 via the two inductors, respectively.

Referring to FIG. 8 and FIG. 9, a mounting hole 215 allowing the connector to pass through is arranged at a joint position where the case 211 is jointed to the endcap 214. An arc-shaped hole 266 for dissipating heat is arranged on a bottom wall of the mounting groove 265, a heat dissipating hole 2142 in communication with the arc-shaped hole 266 is arranged at a position on the endcap 214 corresponding to the arc-shaped hole 266. Two positioning portions 267 are arranged on two sides of the arc-shaped hole 266 of the brush holder 262 towards the endcap, respectively. Each positioning portion 267 includes an approximately-circular boss and a positioning post arranged on the boss, and restricting holes 2145 in communication with the heat dissipating hole 2142 are arranged at two sides of the heat dissipating hole 2142 on the endcap 214. The inductor L, the capacitors C1 and C2 and other elements easy to generate heat in the filtering unit on the printed circuit board 600 are located at a position on the printed circuit board 610 directly facing the arc-shaped hole 266.

The radiator 280 is mounted at an outer side of the endcap 214 of the motor, and is closely attached to an outer surface of the endcap 214 of the motor. The radiator 280 includes a substrate 281 in a shape of approximate sector and a side wall 282 perpendicularly extending from an outer edge of the substrate 281. A projection portion 285 is arranged at a position on the substrate 281 of the radiator 280 corresponding to the heat dissipating hole 2142 and the arc-shaped hole 266. The projection portion 285 extends into the heat dissipating hole 2142 and the arc-shaped hole 266 to be close or contact to the printed circuit board 610, to enhance a heat dissipating effect for a heating element on the printed circuit board 610. A slot is provided on the side wall 282, to be passed through by the connector 268. Two annular lugs 284 extend from two ends of the substrate 281, and each lug 284 is provided with a circular hole at the center. The lugs 284 are accommodated in the restricting holes 2145 of the endcap 214. A convex post of the positioning portion 267 passes through the circular hole to restrict the radiator 280 on the endcap 214. The convex post may be heated to be melted after the radiator 280 is mounted on the endcap 214, to form a header having an outer diameter greater than the circular hole and therefore fix the radiator 280. Multiple fins are formed on an outer surface of the radiator 280 deviating from the endcap 214. The fins are arranged at ranges to increase the heat dissipating area of the radiator 280. A drive disk for the impeller of the fan may be mounted on an output shaft of the motor 20, and the motor 20 drives the impeller to rotate under control of the motor drive device 600, to dissipate heat for the engine of the vehicle.

Figure 11:
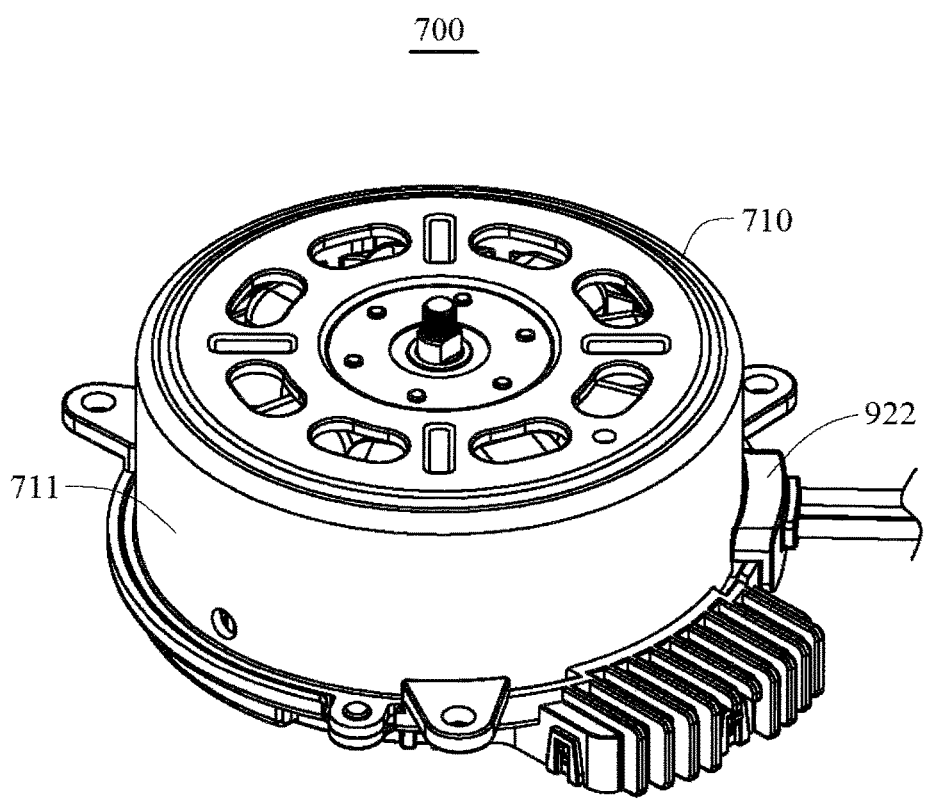
FIG. 11 is a schematic diagram showing a motor of a fan according to a third embodiment of the present disclosure.
Figure 12:
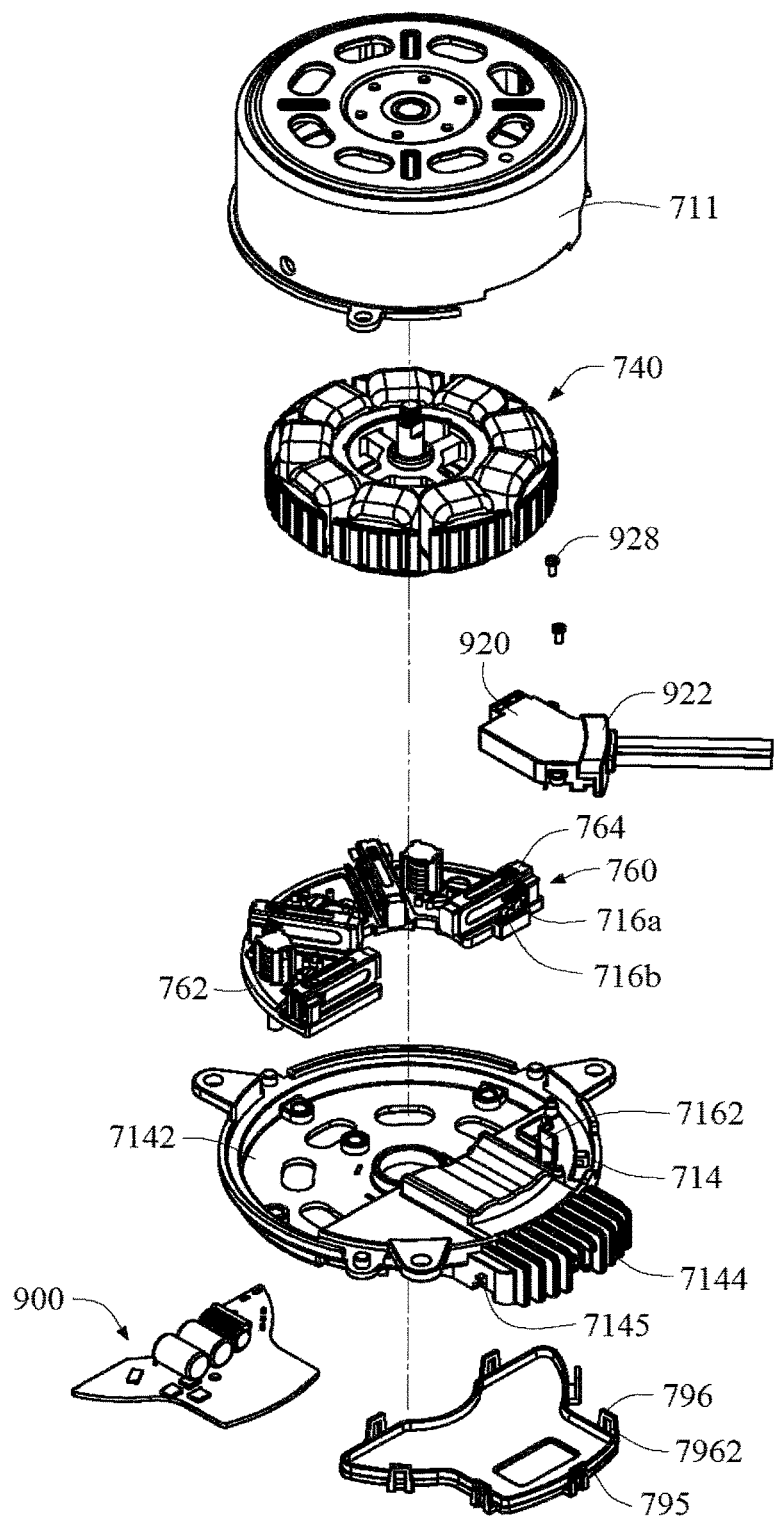
FIG. 12 is an exploded view of the motor shown in FIG. 11.
Figure 13:
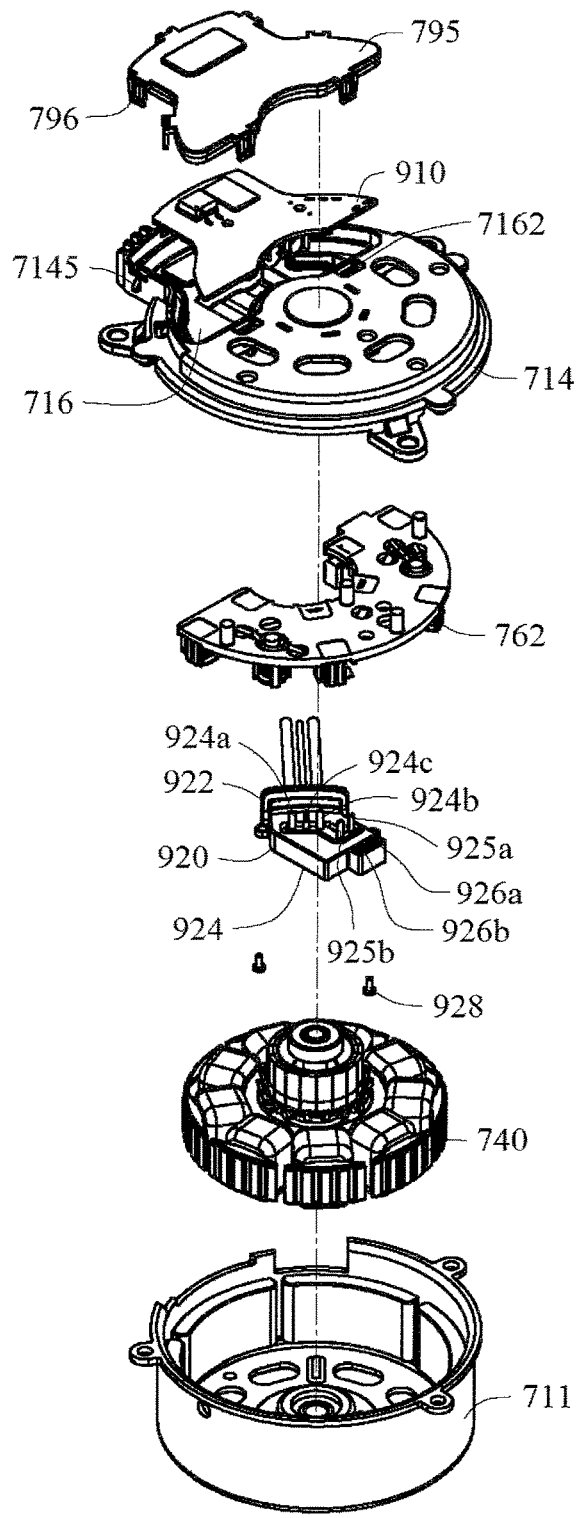
FIG. 13 is an exploded view of the motor shown in FIG. 11 in another direction.

Referring to FIG. 11, which is a perspective view of a fan 700 according a third embodiment of the present disclosure, a difference of the third embodiment from the second embodiment is that the printed circuit board 910 of the motor drive device 900 is arranged at an outer side of the endcap of the motor. Referring to FIG. 12 and FIG. 13, the motor 700 according to the third embodiment of the present disclosure includes a stator 710, a rotor 740 capable of rotating with respect to the stator 710 and accommodated in the stator 710, a brush assembly 760, a motor drive device 900 and a sealing cover 795.

The stator 710 includes a case 711 in an approximately-cylindrical shape and an endcap 714. An opening is formed at one end of the case 711 in an axial direction, and the endcap 714 is fixed at the opening of the case 711 in the axial direction. The brush assembly 760 is arranged between the end cap 714 and the rotor 740. The brush assembly 760 includes a brush holder 762 and four brushes 764 matched with a commutator. The brush holder 762 is in a hemi-circular shape, and the four brushes 764 are arranged on the brush holder 762 at an range of 60 degrees in a circumferential direction. An accommodating chamber 7142 is arranged in the endcap 714, to accommodate the brush holder 762. A radiator 7144 is arranged on a side of the endcap 714 deviating from the accommodating chamber 7142.

Figure 14:
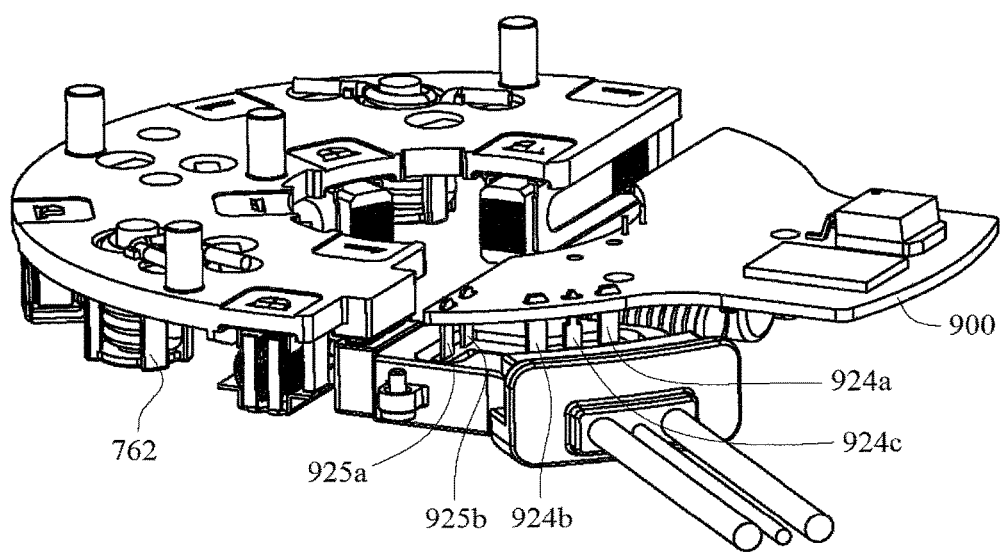
FIG. 14 is a schematic assembly diagram of a printed circuit board of a motor drive device, a connector and a brush holder after an endcap is removed.

The motor drive device 900 includes a printed circuit board 910 and a connector 920. The connector 920 is arranged at a joint position where the endcap 714 is jointed to the case 711, and is fixed on the endcap 714 by a bolt 928. The connector 920 includes a holding portion 922 held at a joint position where the endcap 714 is jointed to the case 711, and a mounting portion 924 bending from one end of the holding portion 922. Referring to FIG. 14, three input terminals 924a to 924c and two output terminals 925a and 925b are arranged on the mounting portion 924. One end of the input terminal 924a is connected to a negative electrode of the external power source via a wire, one end of the input terminal 924b is connected to a positive electrode of the external power source via a wire, and one end of the input terminal 924c is connected to the ECU95 via a wire. The other ends of the input terminals 924a to 924c extend out of the mounting portion 924 towards the endcap 714. Two terminal grooves 926a and 926b are arranged at the front end of the mounting portion 924. The two output terminals 925a and 925b are in an approximate U shape. Each of the output terminals 925a and 925b includes two vertical arms and a horizontal portion. The horizontal portion is arranged in the mounting portion 924. One vertical arm of each of the output terminals extends out of the mounting portion 924 towards the endcap 714, and two side walls of the other vertical arm of each of the output terminals bends oppositely to form a ring portion, to be inserted into a corresponding terminal slot of the terminal slot 926a and 926b. Metal sheets 716a and 716b (referring to FIG. 12), on the brush holder 762, for connecting the brush 764 to the output terminals 925a and 925b may be inserted into the terminal slots 926a and 926b, and are electrically connected to the other vertical arms of the output terminals, so that the motor drive device 900 is connected with the brush of the motor and thus the winding of the rotor.

A recess portion 716 is recessed at the outer side of the endcap 714 adjacent to the radiator 7144, to accommodate the printed circuit board 910 of the motor drive device 900. A through slot 7162 is arranged on a bottom wall of the recess portion 716, to be passed through by the other end of each of the input terminals 924a to 924c and the one vertical arm of each of the output terminals 925a and 925b of the connector 920 mounted in the endcap 714, so as to insert the other end of each of the input terminals 924a to 924c and the one vertical arm of each of the output terminals 925a and 925b onto the printed circuit board 910 mounted at the outer side of the endcap 714. The printed circuit board 910 of the motor drive device 900 is arranged in the recess portion 716 at the outer side of the endcap. The printed circuit board 910 of the motor drive device 900 includes an arc-shaped portion and an extending portion extending from the middle of the arc-shaped portion outward. The recess portion has a shape matched with the printed circuit board 910. The sealing cover 795 is used to fix the printed circuit board 910 on the endcap 714. Multiple buckle hold arms provided with a button hole 7962 are arranged on the periphery of the sealing cover 795, and multiple fixture blocks 7145 are arranged on the endcap 714. The button hole 7962 on the buckle hold arms 796 cooperates with the fixture block 7145 on the endcap 714, to mount the sealing cover 795 and the printed circuit board 910 on the endcap 714.

The rotation speed of the motor is controlled by the motor drive device in the present disclosure at four grades. The control of the rotation speed of the motor may be implemented with separated electronic elements. Alternatively, the motor drive device may also be implemented by an application specific integrated circuit (ASIC), which has a low cost. The motor drive device may be arranged on the fan housing or the motor according to design needs. The motor drive device is convenient to be replaced if the motor drive device is arranged on the fan housing. If the motor drive device is arranged on the motor, an integrated structure is designed for the motor and the motor drive device, and the printed circuit board of the motor drive device is designed to be in a shape for example in an arc shape matched with a chamber inside of the stator according to an inner size of the motor, to insert or mount the motor drive device onto the endcap or the brush holder of the motor. In this case, a mounting position of the motor drive device outside the motor, for example on the fan housing, can be omitted in terms of appearance, thereby simplifying an appearance structure. The motor is directly connected to the motor drive device with a shortest connection line which has the lowest interference to others, thereby reducing an electromagnetic interference and reducing heat generation loss of the connection line, and also improving efficiency and reliability of the system. By omitting the housing of the drive device, the cost is accordingly lower.

It can be understood by those skilled in the art that the motor drive device according to the embodiments of the present disclosure is applicable to drive a fan, a water pump, and other applications driven by a permanent magnet motor or a brush direct-current motor.

The foregoing is only preferred embodiment of the present disclosure, and is not intended to limit the present disclosure. Any changes, equivalent substitutions and modifications made within the spirit and principle of the present disclosure are included in the scope of protection of the present disclosure.

The invention claimed is:

1. A motor, comprising:
a stator,
a rotor rotatably mounted to the stator, and
a motor drive device, wherein
the rotor comprises a rotary shaft, an iron core fixed on the rotary shaft and a winding arranged on the iron core,
the motor drive device is connected between the winding and a power source,
the motor drive device comprises a printed circuit board,
a control management unit and a voltage converter are arranged on the printed circuit board,
the control management unit is configured to classify target rotation speed signals provided by an ECU into a plurality of rotation speed ranges, each corresponding to a specific output duty ratio, the control management unit is configured to receive a target rotation speed signal transmitted from the ECU in a real-time manner, and output a voltage regulating signal, which is a pulse width modulation signal having a duty ratio corresponding to the rotation speed range to which the target rotation speed signal transmitted from the ECU falls; and
the voltage converter is connected between the power source and the winding, and is configured to regulate a voltage outputted to the winding in response to the voltage regulating signal having the specific duty ratio outputted from the control management unit, to regulate a rotation speed of the motor.

2. The motor of claim 1, wherein the control management unit is configured to classify the target rotation speed signals provided by the ECU into four rotation speed ranges, which are a stalling range, a low-speed range, a middle-speed range and a full-speed range.

3. The motor of claim 2, wherein
the target rotation speed signal is in the stalling range in a case that a duty ratio of the target rotation speed signal is less than a ratio value X1, which is less than 10%,
the target rotation speed signal is in the low-speed range in a case that the duty ratio of the target rotation speed signal is greater than or equal to the ratio valve X1 and less than a ratio value X2, which is greater than the ratio valve X1 and less than or equal to 50%,
the target rotation speed signal is in the middle-speed range in a case that the duty ratio of the target rotation speed signal is greater than or equal to the ratio valve X2 and less than a ratio value X3, which is greater than the ratio valve X2 and less than or equal to 90%, and the target rotation speed signal is in the full-speed range in a case that the duty ratio of the target rotation speed signal is greater than or equal to the ratio value X3 and less than 100%.

4. The motor of claim 3, wherein the ratio value X1 is less than or equal to 5%.

5. The motor of claim 3, wherein the ratio value X2 is less than or equal to 40%.

6. The motor of claim 3, wherein the ratio value X3 is less than or equal to 80%.

7. The motor of claim 3, wherein a duty ratio of the voltage regulating signal corresponding to the stalling range is equal to 0, a duty ratio of the voltage regulating signal corresponding to the low-speed range is equal to a ratio value Y1, which is greater than or equal to 20% and is less than or equal to 50%, a duty ratio of the voltage regulating signal corresponding to the middle-speed range is equal to a ratio value Y2, which is greater than or equal to 50% and less than or equal to 80%, and a duty ratio of the voltage regulating signal corresponding to the full-speed range is equal to 100%.

8. The motor of claim 1, wherein the control management unit is configured to classify the target rotation speed signals provided by the ECU into three rotation speed ranges, which are a stalling range, a low-speed range and a full-speed range, and a duty ratio of the voltage regulating signal corresponding to the low-speed range ranges from 20% to 80%.

9. The motor of claim 1, wherein the control management unit comprises:
a command manager configured to determine the rotation speed range to which the target rotation speed signal transmitted from the ECU falls, and output a target voltage in an analog form based on the duty ratio corresponding to the rotation speed range; and
a PWM generator, in which a triangular wave oscillator for generating a triangular wave is arranged, wherein the target voltage is compared with the triangular wave to output the pulse width modulation signal.

10. The motor of claim 1, wherein the voltage converter comprises a diode and an MOS transistor connected between a positive electrode of the power source and ground in series, a cathode of the diode is connected to the positive electrode of the power source, an anode of the diode is connected to a drain of the MOS transistor, and a source of the MOS transistor is grounded, a gate of the MOS transistor receives the voltage regulating signal outputted from the control management unit, and the anode and the cathode of the diode are configured to be connected to the motor.

11. The motor of claim 1, wherein
the stator comprises a cylindrical case, a plurality of permanent magnets arranged at an inner wall of the cylindrical case, and an endcap,
an opening is formed at one end of the cylindrical case in an axial direction, and the endcap is fixed at the opening of the cylindrical case in the axial direction,
the motor further comprises a brush assembly arranged on the endcap, the brush assembly comprises a brush holder and two brushes arranged on the brush holder,
a commutator electrically connected with the winding is arranged on the rotor, the brush is in sliding contact with the commutator, and
the printed circuit board of the motor drive device is arranged on the brush holder.

12. The motor of claim 11, wherein
the brush holder is in an annular shape with a through hole at the center,
the commutator on the rotor passes through the through hole at the center of the brush holder,
the two brushes are arranged on the brush holder at an interval in a circumferential direction, and
a mounting groove is arranged on the brush holder, and the printed circuit board of the motor drive device is accommodated in the mounting groove.

13. The motor of claim 12, wherein an arc-shaped hole for dissipating heat is arranged on a bottom wall of the mounting groove, and a heat dissipation hole in communication with the arc-shaped hole is arranged at a position of the endcap corresponding to the arc-shaped hole.

14. The motor of claim 13, wherein the motor drive device further comprises a filtering unit connected with the voltage converter arranged on the printed circuit board, the filtering unit comprises an inductor, a first capacitor and a second capacitor, the inductor is connected between the power source and the voltage converter, one end of the inductor connected with the power source is grounded via the first capacitor, one end of the inductor connected to the voltage converter is grounded via the second capacitor, and the inductor, the first capacitor and the second capacitor are located at a position of the printed circuit board directly facing the arc-shaped hole.

15. The motor of claim 14, wherein the motor further comprises a radiator, and the radiator is mounted outside the endcap of the motor and is attached to an outer surface of the endcap of the motor closely.

16. The motor of claim 15, wherein the radiator comprises a substrate in an annular-sector shape and a side wall perpendicularly extending from an outer edge of the substrate, a projection portion is arranged at a position of the substrate corresponding to the heat dissipation hole and the arc-shaped hole, the projection portion extends into the heat dissipation hole and the arc-shaped hole, to be close to the printed circuit board.

17. The motor of claim 11, wherein
a connector, for connecting the motor drive device with the power source and the ECU, is integrated at one end of the brush holder,
the connector comprises a base and a shielding housing covered on the base,
three slots are formed on the base, one end of each of three input terminals is accommodated in one of the slot of the base, and is connected with a wire, and the wire extends out of one end of the base,
the other end of each of the three input terminals extends out of the other end of the base, and is fixed on the printed circuit board.

18. The motor of claim 17, wherein two output terminals are arranged on the printed circuit board, and the voltage converter is configured to output a voltage to the winding by the two output terminals.

19. The motor of claim 1, wherein
the stator comprises a cylindrical case, an opening is formed at one end of the cylindrical case in an axial direction, and an endcap is fixed at the opening of the cylindrical case in the axial direction,
a brush holder is arranged in a first accommodating space of the endcap, and
the printed circuit board of the motor drive device is arranged in a second accommodating space of the endcap.

20. The motor of claim 19, wherein the first accommodating space is located at an inner side of the endcap, and the second accommodating space is located at an outer side of the endcap.

21. The motor of claim 19, wherein
the motor drive device comprises a connector,
the connector is arranged at a coupling position where the endcap is coupled to the case, and comprises a holding portion held at the coupling position where the endcap is coupled to the case and a mounting portion extending from one end of the holding portion, and
three input terminals for connecting the power source and the ECU, and two output terminals for outputting a voltage to the winding are arranged on the mounting portion.

22. The motor of claim 21, wherein one end of each of the input terminals is connected with a wire, and the other end of each of the input terminals extends outside the mounting portion towards the endcap.

23. The motor of claim 22, wherein
two terminal grooves are arranged on the mounting portion,
each of the output terminals is in a U shape, and comprises two vertical arms and a horizontal portion,
the horizontal portion is arranged in the mounting portion, and
one vertical arm of the output terminal extends outside the mounting portion towards the endcap, and two side walls of the other vertical arm of the output terminal bends oppositely to form a ring-shaped portion and are inserted into the terminal groove corresponding to the ring-shaped portion.

24. The motor of claim 23, wherein
a brush and a metal sheet are arranged on the brush holder,
the metal sheet is configured to connect the brush to the output terminal, and
the metal sheet is inserted into the terminal groove, and is electrically connected to the other vertical arm of the output terminal.

25. The motor of claim 24, wherein a recess portion is recessed at an outer side of the endcap, to accommodate the printed circuit board of the motor drive device.

26. The motor of claim 25, wherein
a through slot is arranged on a bottom wall of the recess portion, and
the other end of the input terminal of the connector and one vertical arm of the output terminal pass through the through slot to be inserted onto the printed circuit board.

27. The motor of claim 24, wherein the motor further comprises a sealing cover for fixing the printed circuit board onto the endcap.

28. A fan, comprising:
the motor according to claim 1, and
an impeller driven by the motor.

* * * * *